United States Patent Office 3,378,610
Patented Apr. 16, 1968

3,378,610
PHENOXYACETYL PHOSPHONATES
Delta W. Gier, Parkville, Mo., assignor to Chemagro Corporation, New York, N.Y., a corporation of New York
No Drawing. Continuation-in-part of application Ser. No. 412,263, Nov. 18, 1964. This application Apr. 20, 1965, Ser. No. 449,640
12 Claims. (Cl. 260—940)

ABSTRACT OF THE DISCLOSURE

Compounds are provided, which are useful as herbicides, defoliants and desiccants, having the formula

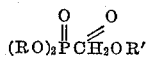

where R is alkyl of up to 18 carbon atoms, phenyl, alkyl phenyl, chloroalkyl and cyanoalkyl and R' is mono, di and trihalophenyl and monohalo monomethyl phenyl.

The present application is a continuation-in-part of application Ser. No. 412,263 filed Nov. 18, 1964.

This invention relates to novel phosphonates and their use as herbicides, defoliants and desiccants.

It is an object of the present invention to prepare new phosphonates.

Another object is to prepare improved compositions and processes for killing undesired plants.

An additional object is to prepare post-emergent herbicides.

A further object is to prepare pre-emergent herbicides.

Yet another object is to prepare formulations showing selective activity as pre-emergent and post-emergent herbicides.

A still further objective is to desiccate plants, particularly cotton.

Another object is to defoliate plants, particularly cotton.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing phosphonates of the formula

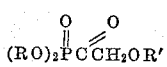

where R is alkyl, preferably lower alkyl, or phenyl, or alkyl phenyl, or haloalkyl or cyanoalkyl or phenyl, or alkyl phenyl and R' is mono, di or trihalophenyl or halo methyl phenyl. The preferred halogen is chlorine. Compounds having the above formula exhibit herbicidal properties. Examples of compounds within the present invention include O,O-dimethyl-4-chlorophenoxyacetyl phosphonate,
O,O-dimethyl-2-chlorophenoxyacetyl phosphonate,
O,O-dimethyl-2-methyl-4-chlorophenoxyacetyl phosphonate,
O,O-dimethyl-2,4-dichlorophenoxyacetyl phosphonate,
O,O-dimethyl-2,4,5-trichlorophenoxyacetyl phosphonate,
O,O-dimethyl-2,4,5-tribromophenoxyacetyl phosphonate,
O,O-dimethyl-2,4-dichloro-5-bromophenoxyacetyl phosphonate,
O,O-dimethyl-2,4,5-trifluorophenoxyacetyl phosphonate,
O,O-diethyl-2-chlorophenoxyacetyl phosphonate,
O,O-diethyl-4-chlorophenoxyacetyl phosphonate,
O,O-diethyl-3-chlorophenoxyacetyl phosphonate,
O,O-diethyl-2,4-dichlorophenoxyacetyl phosphonate,
O,O-diethyl-2,6-dichlorophenoxyacetyl phosphonate,
O,O-diethyl-3,4-dichlorophenoxyacetyl phosphonate,
O,O-diethyl-2,4,5-trichlorophenoxyacetyl phosphonate,
O,O-diethyl-2,4,5-triiodophenoxyacetyl phosphonate,
O,O-diethyl-2-methyl-4-bromophenoxyacetyl phosphonate,
O,O-diethyl-2-methyl-4-chlorophenoxyacetyl phosphonate,
O,O-diethyl-2,3,4-trichlorophenoxyacetyl phosphonate,
O,O-diethyl-2,4,6-trichlorophenoxyacetyl phosphonate,
O-methyl-O-ethyl-2,4,5-trichlorophenoxyacetyl phosphonate,
O,O-dipropyl-4-chlorophenoxyacetyl phosphonate,
O,O-dipropyl-2-chlorophenoxyacetyl phosphonate,
O,O-dipropyl-2,4,5-tri-chlorophenoxyacetyl phosphonate,
O,O-diisopropyl-2-chlorophenoxyacetyl phosphonate,
O,O-di-n-butyl-2-methyl-4-chlorophenoxyacetyl phosphonate,
O,O-di-n-butyl-4-chlorophenoxyacetyl phosphonate,
O,O-di-n-butyl-2-chlorophenoxyacetyl phosphonate,
O,O-di-n-butyl-2,4,5-trichlorophenoxyacetyl phosphonate,
O,O-diamyl-2-methyl-4-chlorophenoxyacetyl phosphonate,
O,O-di-(2-ethylhexyl)-(2-chlorophenoxyacetyl) phosphonate,
O,O-di-(2-ethylhexyl)-(4-chlorophenoxyacetyl) phosphonate,
O,O-di-(2-ethylhexyl)-(2-methyl-4-chlorophenoxyacetyl) phosphonate,
O,O-di-(2-ethylhexyl)-(2,4,5-trichlorophenoxyacetyl) phosphonate,
O,O-diisooctyl-2,4,5-trichlorophenoxyacetyl phosphonate,
O,O-di-n-octyl-4-chlorophenoxyacetyl phosphonate,
O,O-dilauryl-2-chlorophenoxyacetyl phosphonate,
O,O-diphenyl-4-chlorophenoxyacetyl phosphonate,
O,O-diphenyl-2-chlorophenoxyacetyl phosphonate,
O,O-diphenyl-2,4,5-trichlorophenoxyacetyl phosphonate,
O,O-diphenyl-2-methyl-4-chlorophenoxyacetyl phosphonate,
O,O-di-p-tolyl-2-chlorophenoxyacetyl phosphonate,
O,O-di-o-tolyl-4-chlorophenoxyacetyl phosphonate,
O,O-di-m-tolyl-2,4,5-trichlorophenoxyacetyl phosphonate,
O,O-di-o-butylphenyl-2-methyl-4-chlorophenoxyacetyl phosphonate,
O,O-di-2'-chloroethyl-4-chlorophenoxyacetyl phosphonate,
O,O-di-3'-chloropropyl-4-chlorophenoxyacetyl phosphonate,
O,O-di-5'-chloroamyl-4-chlorophenoxyacetyl phosphonate,
O,O-diisopropyl-4-chlorophenoxyacetyl phosphonate,
O,O-di-2'-chloroethyl-2-chlorophenoxyacetyl phosphonate, O,O-di-2'-cyanisopropyl-4-chlorophenoxyacetyl phosphonate,
O,O-di-3'-cyanopropyl-4-chlorophenoxyacetyl phosphonate,
O,O-di-6'-cyanohexyl-4-chlorophenoxyacetyl phosphonate,
O,O-di-octadecyl-4-chlorophenoxyacetyl phosphonate,
O,O-di-p-octylphenyl-4-chlorophenoxyacetyl phosphonate,
O,O-di-2'-chloroethyl-2-methyl-4-chlorophenoxyacetyl phosphonate,
O,O-diisopropyl-2-methyl-4-chlorophenoxyacetyl phosphonate,
O,O-2'-cyanisopropyl-2-methyl-4-chloro-phenoxyacetyl phosphonate,
O,O-dihexyl-2-methyl-4-chlorophenoxyacetyl phosphonate,
O,O-diisooctyl-2-methyl-4-chlorophenoxyacetyl phosphonate,
O,O-dioctadecyl-2-methyl-4-chlorophenoxyacetyl phosphonate,
O,O-di-p-octylphenyl-2-methyl-4-chlorophenoxyacetyl phosphonate,
O,O-dimethyl-2,4-dichlorophenoxyacetyl phosphonate,
O,O-di-2'-chloroethyl-2,4-dichlorophenoxyacetyl phosphonate,
O,O-diisopropyl-2,4-dichlorophenoxyacetyl phosphonate,
O,O-di-2'-cyanoisopropyl-2,4-dichlorophenoxyacetyl phosphonate,
O,O-di-n-butyl-2,4-dichlorophenoxyacetyl phosphonate,
O,O-dihexyl-2,4-dichlorophenoxyacetyl phosphonate,
O,O-diisooctyl-2,4-dichlorophenoxyacetyl phosphonate,
O,O-di-2'-ethylhexyl-2,4-dichlorophenoxyacetyl phosphonate,
O,O-dioctadecyl-2,4-dichlorophenoxyacetyl phosphonate,
O,O-diphenyl-2,4-dichlorophenoxyacetyl phosphonate,
O,O-di-2'-chloroethyl-2,4,5-trichlorophenoxyacetyl phosphonate,
O,O-diisopropyl-2,4,5-trichlorophenoxyacetyl phosphonate,
O,O-di-2'-cyanoisopropyl-2,4,5-trichlorophenoxyacetyl phosphonate,
O,O-dihexyl-2,4,5-trichlorophenoxyacetyl phosphonate,
O,O-dioctadecyl-2,4,5-trichlorophenoxyacetyl phosphonate,
O,O-di-p-octylphenyl-2,4,5-trichlorophenoxyacetyl phosphonate.

The new compounds of the present invention are prepared by the following procedures.

Procedure A

A known quantity of the phenoxyacetyl chloride is placed in a reaction flask equipped with a mechanical stirrer, condenser and dropping funnel. (Solid acid chlorides were dissolved in a minimum of dry benzene while liquid acid chlorides were reacted without solvent.) Slightly more than an equimolar quantity of the desired trialkyl phosphite was added dropwise to the phenoxy acetyl chloride with vigorous stirring. For 0.1 molar quantities, 20 to 30 minute periods were necessary for addition of the phosphite. In all cases, the reaction rates were relatively high and easily observable by liberation of heat. Following the addition of the phosphite, the reaction mixture was heated to 80–100° C. for 2–3 hours.

A vacuum was then applied to the reaction flask (0.5–1.0 mm. pressure) and the product was stripped at a pot temperature of 110–150° C. All of the products obtained were clear to pale red oils, or semi-solids of high solubility in most organic solvents.

The essence of the above procedure is reacting the phenoxyacetyl chloride with a trialkyl phosphite and removing the organic chloride formed, preferably under reduced pressure.

Procedure B

A known quantity of the phenoxyacetyl chloride was placed in the reaction flask. (Solid acid chlorides were dissolved in a minimum of dry benzene while no solvent was used with liquid acid chlorides.) Slightly more than an equimolar quantity of the desired dialkyl hydrogen phosphite or diaryl hydrogen phosphite was added dropwise to the phenoxy acetyl chloride with vigorous stirring. For 0.1 molar quantities, 20 to 30 minute periods were necessary for addition of the phosphite. In all cases, the reaction rates were relatively high and easily observable by liberation of heat. Following addition of the phosphite, aspirator vacuum (50–75 mm. pressure) was applied to the reaction flask through the condenser and the reaction mixture was heated to 80–110° C. for 2–3 hours.

A vacuum (0.5–1 mm. pressure) was then applied to the reaction flask and the product was stripped at a pot temperature of 110–150° C. All of the products obtained were clear to pale red oils, or semi-solids having a high solubility in most organic solvents.

The essence of Procedure B is reacting the phenoxy acetyl chloride with a dialkyl or diaryl hydrogen phosphite and removing the hydrogen chloride formed, preferably under reduced pressure.

The O,O-dialkyl phosphonates can be prepared by either Procedure A or Procedure B. The O,O-diaryl phosphonates can be prepared only by Procedure B.

Illustrative of starting phenoxy acetyl chlorides are 2-chlorophenoxy acetyl chloride, 4-chlorophenoxy acetyl chloride, 2,4-dichlorophenoxy acetyl chloride, 2,4,5-trichlorophenoxy acetyl chloride, 2,4,5-tribromophenoxy acetyl chloride, 2,4,5-tribromophenoxy acetyl bromide, 2-methyl-4-chlorophenoxy acetyl chloride.

Illustrative of starting phosphites for Procedure A are trimethyl phosphite, triethyl phosphite, dimethyl ethyl phosphite, tripropyl phosphite, triisopropyl phosphite, tri-n-butyl phosphite, trihexyl phosphite, tri-n-octyl phosphite, triisooctyl phosphite, tri (2-ethyl hexyl) phosphite, and trilauryl phosphite.

Illustrative starting phosphites for Procedure B are dimethyl hydrogen phosphite, diethyl hydrogen phosphite, dipropyl hydrogen phosphite, diisopropyl hydrogen phosphite, di-n-butyl hydrogen phosphite, di-2-ethyl hexyl hydrogen phosphite, diphenyl hydrogen phosphite, di-p-tolyl hydrogen phosphite.

Unless otherwise indicated all parts and percentages are by weight.

Example 1

10.25 grams (0.05 mole) of p-chlorophenoxy acetyl chloride was treated according to Procedure A with 6.2 grams (0.05 mole) of trimethyl phosphite to give 6.7 grams (48% yield) of O,O-dimethyl-4-chlorophenoxy acetyl phosphonate as a clear oil; $n_D^{25}$ 1.4965; percent Cl 11.3 (12.7 theory); percent P 11.8 (11.1 theory).

Example 2

10.25 grams (0.05 mole) of p-chlorophenoxy acetyl chloride was treated according to Procedure A with 8.3 grams (0.05 mole) of triethyl phosphite to give 11.0 grams (72% yield) of O,O-diethyl-4-chlorophenoxy acetyl phosphonate as a clear oil; $n_D^{25}$ 1.4955; percent Cl 10.6 (theory 11.2); percent P 10.4 (theory 10.0).

Example 3

10.25 grams (0.05 mole) of p-chlorophenoxy acetyl chloride was treated according to Procedure A with 12.5 grams (0.05 mole) of tri-n-butyl phosphite to give 14.3 grams (78% yield) of O,O-di-n-butyl-4-chlorophenoxy acetyl phosphonate as a clear oil; $n_D^{25}$ 1.4904; percent Cl 9.4 (theory 9.7); percent P 8.4 (theory 8.5).

Example 4

10.25 grams (0.05 mole) of p-chlorophenoxy acetyl chloride was treated according to Procedure B with 11.7 grams (0.05 mole) of diphenyl hydrogen phosphite to give 15.3 grams (75% yield) of O,O-diphenyl-4-chlorophenoxy acetyl phosphonate as a clear oil; $n_D^{25}$ 1.5740; percent Cl 9.1 (theory 8.8); percent P 8.1 (theory 7.7).

Example 5

10.25 grams (0.05 mole) of O-chlorophenoxy acetyl chloride was treated according to Procedure A with 6.2 grams (0.05 mole) of trimethyl phosphite to give 11.0 grams (78.6% yield) of O,O-dimethyl-2-chlorophenoxy acetyl phosphonate as a clear oil; $n_D^{25}$ 1.5185; percent Cl 13.6 (theory 12.7); percent P 10.4 (theory 11.1).

Example 6

20.5 grams (0.1 mole) of O-chlorophenoxy acetyl chloride was treated according to Procedure A with 20 grams (0.12 mole) of triethyl phosphite to give 28.3 grams (97.6% yield) of O,O-diethyl-2-chlorophenoxy acetyl phosphonate as a light rose-colored oil; $n_D^{25}$ 1.5040; percent Cl 10.0 (theory 9.7); percent P 10.4 (theory 11.1).

Example 7

10.25 grams (0.05 mole) of O-chlorophenoxy acetyl chloride was treated according to Procedure A with 12.5 grams (0.05 mole) of tri-n-butyl phosphite to give 15.9 grams (78.3% yield) of O,O-di-n-butyl-2-chlorophenoxy acetyl phosphonate as a clear oil; $n_D^{25}$ 1.4895; percent Cl 9.2 (theory 9.7); percent P 8.8 (theory 8.5).

Example 8

10.25 grams (0.05 mole) of O-chlorophenoxy acetyl chloride was treated according to Procedure B with 11.7 grams (0.05 mole) of diphenyl hydrogen phosphite to give 15 grams (74% yield) of O,O-diphenyl-2-chlorophenoxy acetyl phosphonate as a light yellow oil; $n_D^{25}$ 1.5703; percent Cl 8.4 (theory 8.8); percent P 7.5 (theory 7.6).

Example 9

13.8 grams (0.05 mole of 2,4,5-trichlorophenoxy acetyl chloride was treated according to Procedure A with 6.2 grams (0.05 mole) of trimethyl phosphite to give 13.0 grams (74.9% yield) of O,O-dimethyl-2,4,5-trichlorophenoxy acetyl phosphonate as a white semi-solid; $n_D^{25}$ 1.5012; percent Cl 33 (theory 31); percent P 8.3 (theory 8.8).

Example 10

53.6 grams (0.2 mole of 2,4,5-trichlorophenoxy acetyl chloride was treated according to Procedure A with 33.2 grams (0.2 mole) of triethyl phosphite to give 65 grams (95.6% yield) of O,O-diethyl-2,4,5-trichlorophenoxy acetyl phosphonate as a pale yellow semi-solid; $n_D^{25}$ 1.5015; percent Cl 28.5 (theory 28.2); percent P 8.2 (theory 8.3).

Example 11

13.8 grams (0.05 mole) of 2,4,5-trichlorophenoxy acetyl chloride was treated according to Procedure A with 15.0 grams (0.06 mole) of tri-n-butyl-phosphite to give 20.6 grams (80% yield) of O,O-di-n-butyl-2,4,5-trichlorophenoxy acetyl phosphonate as a clear oil; $n_D^{25}$ 1.4950; percent Cl 23.8 (theory 24.5); percent P 7.8 (theory 7.2).

Example 12

13.8 grams (0.05 mole) of 2,4,5-trichlorophenoxy acetyl chloride was treated according to Procedure B with 11.7 grams (0.05 mole) of diphenyl hydrogen phosphite to give 16.6 grams (70% yield) of O,O-diphenyl-2,4,5-trichlorophenoxy acetyl phosphonate as a pale yellow semi-solid; $n_D^{25}$ 1.5715; percent Cl 19.5 (theory 22.5); percent P 7.2 (theory 6.6).

Example 13

11.55 grams (0.05 mole) of 2-methyl-4-chlorophenoxy acetyl chloride was treated according to Procedure A with 6.2 grams (0.05 mole) of trimethyl phosphite to give 14.3 grams (98% yield) of O,O-dimethyl-2-methyl-4-chlorophenoxy acetyl phosphonate as a pale yellow oil; $n_D^{25}$ 1.5106; percent Cl 12.8 (theory 12.1); percent P 10.3 (theory 10.6).

Example 14

20.1 grams (0.1 mole) of 2-methyl-4-chlorophenoxy acetyl chloride was treated according to Procedure A with 20 grams (0.12 mole) of triethyl phosphite to give 29.4 grams (99% yield) of O,O-diethyl-2-methyl-4-chlorophenoxy acetyl phosphonate as a pale pink oil; $n_D^{25}$ 1.5015; percent Cl 10.6 (theory 11.6); percent P 10.0 (theory 10.1).

Example 15

11.55 grams (0.05 mole) of 2-methyl-4-chlorophenoxy acetyl chloride was treated according to Procedure A with 12.5 grams (0.05 mole) of tri-n-butyl phosphite to give 18.6 grams (99% yield) of O,O-di-n-butyl-2-methyl-4-chlorophenoxy acetyl phosphonate as a clear oil; $n_D^{25}$ 1.4974; percent Cl 9.7 (theory 9.4); percent P 7.9 (theory 8.3).

Example 16

11.55 grams (0.05 mole) of 2-methyl-4-chlorophenoxy acetyl chloride was treated according to Procedure B with 11.7 grams (0.05 mole) of diphenyl hydrogen phosphite to give 19.3 grams (93% yield) of O,O-diphenyl-2-methyl-4-chlorophenoxy acetyl phosphonate as a clear oil; $n_D^{25}$ 1.5680; percent Cl 8.5 (theory 8.5); percent P 8.2 (theory 7.4).

Example 17

10.25 grams (0.05 mole) of o-chlorophenoxy acetyl chloride was treated according to Procedure B with 15.3 grams (0.05 mole) of di-2-ethyl hexyl hydrogen phosphite to give 17.8 grams (75% yield) of O,O-di-2-ethyl hexyl-2-chlorophenoxy acetyl phosphonate as a clear oil; $n_D^{25}$ 1.4860; percent Cl 7.2 (theory 7.5); percent P 6.2 (theory 6.5).

Example 18

10.25 grams (0.05 mole) of p-chlorophenoxy acetyl chloride was treated according to Procedure B with 15.3 grams (0.05 mole) of di-2-ethyl hexyl hydrogen phosphite to give 17.8 grams (75% yield) of O,O-di-2-ethyl hexyl-4-chlorophenoxy acetyl phosphonate as a clear oil; $n_D^{25}$ 1.4839; percent Cl 6.7 (theory 7.5); percent P 6.6 (theory 6.5).

Example 19

11.55 grams (0.05 mole) of 2-methyl-4-chlorophenoxy acetyl chloride was treated according to Procedure B with 15.3 grams (0.05 mole) of di-2-ethyl hexyl hydrogen phosphite to give 21 grams (85% yield) of O,O-di-(2-ethyl hexyl)-(2-methyl-4-chlorophenoxy acetyl) phosphonate as a clear oil; $n_D^{25}$ 1.4858; percent Cl 7.0 (theory 7.2); percent P 5.5 (theory 6.3).

Example 20

13.8 grams (0.05 mole) of 2,4,5-trichlorophenoxy acetyl chloride was treated according to Procedure B with 15.3 grams (0.05 mole) of di-2-ethyl hexyl hydrogen phosphite to give 15.8 grams (58% yield) of O,O-di-(2-ethyl hexyl)-(2,4,5-trichlorophenoxy acetyl) phosphonate as a clear oil; $n_D^{25}$ 1.4875; percent Cl 18.8 (theory 19.6); percent P 6.7 (theory 5.7).

Using Procedure A with the appropriate substituted phenoxyacetyl phosphite and the appropriate trialkyl or tri substituted alkyl phosphite, e.g. tris (2-chloroethyl) phosphite, tris (2-cyanoisopropyl) phosphite, tris octadecyl phosphite there were obtained as shown in Table A the indicated chlorophenoxy acetyl phosphonates where X and Y indicated the substituents on the phenoxy group and R and R' indicate the groups attached to the two available oxygens of the phosphonate. As indicated in the table, R and R' were the same.

Using Procedure B in similar fashion there were obtained the indicated phosphonates wherein R and R' were aryl.

TABLE A

| X | Y | R and R' | Percent Yield | Percent Cl Found | Percent Cl Theory | Percent P Found | Percent P Theory |
|---|---|---|---|---|---|---|---|
| 4-chloro | | 2'-chloroethyl | 98 | 27.9 | 28.3 | 7.9 | 8.2 |
| Do | | Isopropyl | 92 | 10.6 | 10.6 | 9.3 | 9.3 |
| Do | | 2'-cyanoisopropyl | 91 | 9.9 | 9.5 | 7.1 | 8.3 |
| Do | | Hexyl | 93 | 8.6 | 8.5 | 7.1 | 7.4 |
| Do | | Isooctyl | 92 | 7.8 | 7.5 | 6.0 | 6.5 |
| Do | | Octadecyl | 99 | 7.5 | 7.5 | 6.6 | 6.5 |
| Do | | p-Octylphenyl | 99 | 9.5 | 8.7 | 6.7 | 7.6 |
| Do | 2-methyl | 2'-chloroethyl | 99 | 28.6 | 27.4 | 7.5 | 7.9 |
| Do | do | Isopropyl | 88 | 11.0 | 10.2 | 8.7 | 8.9 |
| Do | do | 2'-Cyanoisopropyl | 67 | 11.4 | 9.1 | 7.0 | 7.9 |
| Do | do | Hexyl | 99 | 9.0 | 8.2 | 6.5 | 7.1 |
| Do | do | Isooctyl | 72 | 8.0 | 7.3 | 7.3 | 6.3 |
| Do | do | Octadecyl | 99 | 4.1 | 4.6 | 3.7 | 4.0 |
| Do | do | p-Octylphenyl | 99 | 10.1 | 7.9 | 6.3 | 6.9 |
| 2,4-dichloro | | Methyl | 89 | 22.3 | 22.7 | 9.7 | 9.9 |
| Do | | Ethyl | 93 | 19.8 | 21.0 | 9.2 | 9.2 |
| Do | | 2'-chloroethyl | 98 | 34.6 | 34.8 | 7.4 | 7.6 |
| Do | | Isopropyl | 84 | 18.4 | 19.2 | 9.0 | 8.4 |
| Do | | 2'-cyanoisopropyl | 94 | 16.6 | 17.4 | 7.3 | 7.6 |
| Do | | n-Butyl | 98 | 18.1 | 17.9 | 7.8 | 7.8 |
| Do | | Hexyl | 97 | 16.8 | 15.7 | 6.6 | 6.8 |
| Do | | Isooctyl | 97 | 14.6 | 14.0 | 5.6 | 6.1 |
| Do | | 2'-ethylhexyl | 78 | 13.0 | 14.0 | 6.8 | 6.1 |
| Do | | Octadecyl | 99 | 8.3 | 9.0 | 3.7 | 3.9 |
| Do | | p-Octylphenyl | 92 | 12.4 | 14.9 | 6.6 | 6.5 |
| Do | | Phenyl | 84 | 17.0 | 16.2 | 7.8 | 7.1 |
| 2,4,5-trichloro | | 2'-chloroethyl | 85.3 | 38.6 | 39.9 | 7.0 | 7.0 |
| Do | | Isopropyl | 69 | 29.7 | 26.5 | 6.7 | 7.7 |
| Do | | 2-cyanoisopropyl | 52 | 21.0 | 25.1 | 5.1 | 7.3 |
| Do | | Hexyl | 69 | 19.6 | 21.8 | 6.5 | 6.4 |
| Do | | Isooctyl | 81 | 17.5 | 19.6 | 6.0 | 5.7 |
| Do | | Octadecyl | 99 | 14.2 | 13.0 | 3.7 | 3.8 |
| Do | | p-Octylphenyl | 73 | 21.1 | 20.9 | 6.3 | 6.1 |

The compounds of the present invention can be used alone as herbicides, defoliants or desiccants but it has been found desirable to apply them together with inert solids to form dusts, or more preferably suspended in a suitable liquid diluent, preferably water. There can also be added surface active agents and inert solids in such liquid formulations. Desirably, 0.05–1% by weight of surface active agent is employed. The active ingredient can be from 0.01 to 95% by weight of the entire composition in such cases.

In place of water there can be employed organic solvents as carriers, e.g. hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g. ethylene glycol monomethyl ether and diethylene glycol monomethyl ether, alcohols, e.g. ethanol, isopropanol and amyl alcohol, etc.

The herbicides, defoliants and desiccants of the present invention can also be applied with inert herbicidal adjuvants or carriers such as talc, pyrophyllite, synthetic fine silica, attaclay, kieselguhr, chalk, diatomaceous earth, lime, calcium carbonate, bentonite, fuller's earth, cottonseed hulls, wheat flour, soyabean flour, pumice, tripoli, wood flour, walnut shell flour, redwood flour and lignin.

It is frequently desirable to incorporate a surface active agent in the herbicidal, defoliant or desiccant compositions of this invention. Such surface active agents, i.e., wetting agents, are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkyl benzene sulfonates having 14 to 18 carbon atoms in the alkyl group, alkylphenolethylene oxide condensation products, e.g. p-isooctylphenol condensed with 10 ethylene oxide units, soaps, e.g. sodium stearate and potassium oleate, sodium salt of propylnaphthalene sulfonic acid, (di-2-ethyl hexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids and rosin acids, e.g. Ethofat 7 and 13, sodium N-methyl-N-oleyltaurate, Turkey red oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide propylene oxide condensation product, e.g. Pluronic 61, sorbitan monolaurate, polyethylene glycol ester of tall oil acids, sodium octylphenoxyethoxyethyl sulfate, tris (polyoxyethylene) sorbitan monostearate (Tween 60), sodium dihexyl sulfosuccinate.

The solid and liquid formulations can be prepared by any of the conventional methods. Thus the active ingredient can be mixed with the solid carrier in finely divided form in amounts small enough to preserve the free-flowing property of the final dust composition.

When using the compounds as defoliants or desiccants, they of course should be used in an amount less than that which will have a herbicidal effect on the plants to be defoliated or desiccated. While the compounds are primarily useful in the defoliant and desiccant field with cotton, they can also be employed to defoliate or desiccate other crops such as beans for example.

In the following examples or tables illustrating herbicidal activity the phosphonates were formulated into the following pre-mix, the parts being expressed by volume.

8 parts of a mixture of mono-, di- and tri-methyl naphthalenes (Velsicol AR 50 G).

1 part butyl carbitol acetate.

1 part Triton X 161 (a mixture of p-octylphenolethylene oxide adduct containing about 16 ethylene oxide units together with a sodium alkylphenol sulfonate).

Two pounds per gallon of the test chemical were added to this pre-mix.

In the pre-emergent herbicide tests the efficiency of the candidate was measured by planting the indicated plants in soil and spraying the surface of the soil with the chemical the same day the plants are planted.

In the post-emergent herbicide test, the plants were allowed to grow for 10–14 days prior to application of the herbicides.

In the following tables the effect of the herbicide is mentioned on the scale from 0–10 where 0 is no effect and 10 is complete herbicide effect, namely 100% dead plants.

In the tables the rates are expressed in pounds of active ingredient per acre.

Table 1 is a preliminary post-emergent herbicide test and Table 2 is a preliminary pre-emergent herbicide test.

ing Tables 3, 4, 5, and 6. As can be seen from the Tables 3-6, the compounds of the present invention show selective activity as pre-emergent and post-emergent herbicides.

Furthermore, several of the compounds including O,O-dimethyl - (2,4,5 - trichlorophenoxy acetyl) phosphonate,

TABLE 1

| R | R' | Rate | Flax | Sugar Beets | Rad. | Bean | Wheat | Oats |
|---|---|---|---|---|---|---|---|---|
| Ethyl | 2,4,5-trichlorophenyl | 20 | 10 | 10 | 10 | --- | 7 | 8 |
|  |  | 5 | 10 | 10 | 9 | --- | 8 | 3 |
| Do | 2-methyl-4-chlorophenyl | 8 | 10 | --- | 10 | 9 | 9 | 9 |
|  |  | 2 | 8 | --- | 9 | 9 | 7 | 4 |
| Do | 2-chlorophenyl | 8 | 6 | --- | 9 | 9 | 8 | 9 |
|  |  | 2 | 2 | --- | 3 | 1 | 4 | 2 |

TABLE 2

| R | R' | Rate | Flax | Sugar Beets | Rad. | Bean | Wheat | Oats |
|---|---|---|---|---|---|---|---|---|
| Ethyl | 2,4,5-trichlorophenyl | 20 | 8 | 10 | 8 | --- | 0 | 0 |
|  |  | 5 | 5 | 7 | 4 | --- | 0 | 0 |
| Do | 2-methyl-4-chlorophenyl | 8 | 4 | --- | 9 | 9 | 3 | 0 |
|  |  | 2 | 5 | --- | 9 | 9 | 0 | 0 |
| Do | 2-chlorophenyl | 8 | 2 | --- | 3 | 3 | 0 | 4 |
|  |  | 2 | 0 | --- | 0 | 0 | 0 | 0 |

In all of the herbicide tables the compounds employed have the following formula:

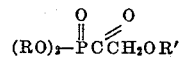

where R and R' have the indicated values.

Because these preliminary tests have such good results, the testing was repeated and expanded to include other compounds within the formula, as set forth in the following Tables 3, 4, 5, and 6.

O,O-di-n-butyl-(2,4,5-trichlorophenoxy acetyl) phosphonate, O,O-diphenyl-(2,4,5-trichlorophenoxy acetyl) phosphonate, O,O-diethyl-(4-chlorophenoxy acetyl) phosphonate, O,O-di-n-butyl-(4-chlorophenoxy acetyl) phosphonate, O,O-diphenyl-(4-chlorophenoxy acetyl) phosphonate, and O,O-di-(2-ethyl hexyl)-(4-chlorophenoxy acetyl) phosphonate exhibit high herbicidal activity on broad leaf plants accompanied by a marked retardation of growth of grasses.

TABLE 3.—PRIMARY SCREENING—POST-EMERGENCE ACTIVITY

| R' | R | Rate | Oats | Sugar Beets | Radishes | Flax | Wheat |
|---|---|---|---|---|---|---|---|
| 4-chlorophenyl | Methyl | 8 | 7 | 9 | 9 | 9 | 6 |
|  |  | 2 | 1 | 2 | 7 | 7 | 0 |
| Do | Ethyl | 8 | 4 | 6 | 8 | 9 | 9 |
|  |  | 2 | 0 | 3 | 7 | 6 | 0 |
| Do | n-Butyl | 8 | 3 | 8 | 8 | 8 | 6 |
|  |  | 2 | 0 | 3 | 7 | 6 | 0 |
| Do | Phenyl | 8 | 2 | 6 | 8 | 9 | 6 |
|  |  | 2 | 0 | 3 | 6 | 4 | 0 |
| 2-chlorophenyl | Methyl | 8 | 5 | 6 | 6 | 8 | 4 |
|  |  | 2 | 0 | 1 | 5 | 0 | 0 |
| Do | Ethyl | 8 | 3 | 3 | 5 | 3 | 3 |
|  |  | 2 | 1 | 0 | 2 | 0 | 0 |
| Do | n-Butyl | 8 | 6 | 9 | 7 | 7 | 7 |
|  |  | 2 | 0 | 0 | 3 | 0 | 3 |
| Do | Phenyl | 8 | 8 | 9 | 7 | 6 | 7 |
|  |  | 2 | 0 | 0 | 3 | 0 | 1 |
| 2,4,5-trichlorophenyl | Methyl | 8 | 6 | 8 | 9 | 10 | 8 |
|  |  | 2 | 1 | 5 | 8 | 8 | 3 |
| Do | Ethyl | 8 | 7 | 9 | 9 | 9 | 6 |
|  |  | 2 | 1 | 2 | 7 | 7 | 0 |
| Do | n-Butyl | 8 | 7 | 7 | 8 | 10 | 6 |
|  |  | 2 | 7 | 5 | 7 | 7 | 3 |
| Do | Phenyl | 8 | 7 | 10 | 9 | 9 | 7 |
|  |  | 2 | 6 | 6 | 8 | 9 | 6 |
| 4-chloro-2-methyl phenyl | Methyl | 8 | 7 | 10 | 9 | 7 | 6 |
|  |  | 2 | 1 | 6 | 8 | 8 | 1 |
| Do | Ethyl | 8 | 6 | 7 | 9 | 6 | 5 |
|  |  | 2 | 0 | 2 | 7 | 3 | 0 |
| Do | n-Butyl | 8 | 6 | 9 | 9 | 8 | 8 |
|  |  | 2 | 3 | 5 | 8 | 0 | 0 |
| Do | Phenyl | 8 | 3 | 6 | 7 | 4 | 6 |
|  |  | 2 | 0 | 4 | 7 | 4 | 0 |
| 2-chlorophenyl | 2-ethyl hexyl | 8 | 7 | 6 | 6 | 3 | 2 |
|  |  | 2 | 0 | 6 | 1 | 0 | 1 |
| 4-chlorophenyl | do | 8 | 6 | 6 | 8 | 7 | 8 |
|  |  | 2 | 4 | 6 | 6 | 6 | 1 |
| 4-chloro-2-methyl phenyl | do | 8 | 7 | 9 | 9 | 8 | 9 |
|  |  | 2 | 0 | 5 | 8 | 4 | 0 |
| 2,4,5-trichlorophenyl | do | 8 | 9 | 9 | 9 | 9 | 3 |
|  |  | 2 | 6 | 8 | 9 | 7 | 7 |

TABLE 4.—PRIMARY SCREENING—PRE-EMERGENCE ACTIVITY

| R' | R | Rate | Oats | Sugar Beets | Radishes | Flax | Wheat |
|---|---|---|---|---|---|---|---|
| 4-chlorophenyl | Methyl | 8 | 4 | 10 | 10 | 10 | 9 |
|  |  | 2 | 1 | 8 | 8 | 10 | 7 |
| Do | Ethyl | 8 | 3 | 10 | 9 | 10 | 8 |
|  |  | 2 | 0 | 8 | 8 | 10 | 7 |
| Do | n-Butyl | 8 | 4 | 10 | 10 | 10 | 9 |
|  |  | 2 | 3 | 8 | 9 | 10 | 5 |
| Do | Phenyl | 8 | 6 | 9 | 9 | 10 | 7 |
|  |  | 2 | 6 | 9 | 9 | 10 | 7 |
| 2-chlorophenyl | Methyl | 8 | 0 | 7 | 7 | 6 | 6 |
|  |  | 2 | 0 | 4 | 5 | 3 | 4 |
| Do | Ethyl | 8 | 0 | 0 | 0 | 0 | 0 |
|  |  | 2 | 0 | 0 | 0 | 0 | 0 |
| Do | n-Butyl | 8 | 2 | 5 | 6 | 4 | 6 |
|  |  | 2 | 0 | 2 | 4 | 2 | 6 |
| Do | Phenyl | 8 | 5 | 7 | 7 | 6 | 3 |
|  |  | 2 | 0 | 0 | 5 | 5 | 0 |
| 2,4,5-trichlorophenyl | Methyl | 8 | 4 | 10 | 10 | 10 | 8 |
|  |  | 2 | 0 | 6 | 7 | 8 | 3 |
| Do | Ethyl | 8 | 2 | 7 | 7 | 9 | 1 |
|  |  | 2 | 2 | 2 | 0 | 1 | 2 |
| Do | n-Butyl | 8 | 3 | 8 | 8 | 9 | 6 |
|  |  | 2 | 2 | 6 | 7 | 6 | 2 |
| Do | Phenyl | 8 | 4 | 9 | 8 | 9 | 6 |
|  |  | 2 | 3 | 7 | 8 | 9 | 3 |
| 4-chloro-2-methyl phenyl | Methyl | 8 | 7 | 10 | 10 | 10 | 9 |
|  |  | 2 | 3 | 10 | 10 | 10 | 8 |
| Do | Ethyl | 8 | 6 | 9 | 9 | 9 | 9 |
|  |  | 2 | 3 | 8 | 8 | 5 | 4 |
| Do | n-Butyl | 8 | 9 | 10 | 10 | 10 | 9 |
|  |  | 2 | 0 | 9 | 9 | 9 | 6 |
| Do | Phenyl | 8 | 3 | 10 | 10 | 10 | 7 |
|  |  | 2 | 0 | 9 | 9 | 8 | 3 |
| 2-chlorophenyl | 2-ethyl hexyl | 8 | 4 | 4 | 7 | 5 | 2 |
|  |  | 2 | 0 | 3 | 5 | 2 | 0 |
| 4-chlorophenyl | do | 8 | 7 | 9 | 9 | 10 | 9 |
|  |  | 2 | 6 | 9 | 9 | 10 | 9 |
| 4-chloro-2-methyl phenyl | do | 8 | 9 | 10 | 10 | 10 | 4 |
|  |  | 2 | 4 | 8 | 9 | 4 | 3 |
| 2,4,5-trichlorophenyl | do | 8 | 7 | 9 | 9 | 10 | 8 |
|  |  | 2 | 0 | 8 | 7 | 9 | 6 |

TABLE 5.—SECONDARY SCREENING—POST-EMERGENCE ACTIVITY

| R' | R | Rate | Oats | Cuc. | Snap Beans | Corn | Wheat | Flax | Cotton | Rad. | Sugar Beets | Alfalfa |
|---|---|---|---|---|---|---|---|---|---|---|---|---|
| 4-chlorophenyl | Methyl | 4 | 5 | 10 | 10 |  | 1 | 9 | 8 | 8 | 9 | 10 |
|  |  | 2 | 1 | 7 | 9 | 0 | 0 | 7 | 7 | 9 | 8 | 7 |
|  |  | 1 | 0 | 6 | 8 | 0 | 0 | 6 | 7 | 9 | 9 | 7 |
| Do | Ethyl | 4 | 3 | 9 | 10 | 6 | 5 | 9 | 8 | 9 | 10 | 10 |
|  |  | 2 | 0 | 9 | 10 | 6 | 6 | 9 | 8 | 8 | 7 | 8 |
|  |  | 1 | 1 | 7 | 9 | 1 | 0 | 6 | 6 | 8 | 8 | 7 |
| Do | n-Butyl | 4 | 7 | 9 | 10 | 3 | 6 | 9 | 7 | 9 | 9 | 7 |
|  |  | 2 | 0 | 9 | 10 | 0 | 4 | 6 | 7 | 8 | 6 | 7 |
|  |  | 1 | 0 | 7 | 9 | 0 | 5 | 5 | 7 | 8 | 5 | 7 |
| Do | Phenyl | 4 | 3 | 10 | 9 | 0 | 4 | 10 | 9 | 9 | 9 | 8 |
|  |  | 2 | 0 | 6 | 8 | 1 | 0 | 5 | 5 | 8 | 6 | 7 |
|  |  | 1 | 0 | 7 | 9 | 0 | 0 | 3 | 5 | 9 | 7 | 6 |
| 2,4,5-trichlorophenyl | Methyl | 4 | 7 | 10 | 10 | 2 | 0 | 10 | 7 | 10 | 10 | 10 |
|  |  | 2 | 3 | 10 | 10 | 3 | 0 | 9 | 7 | 10 | 10 | 10 |
|  |  | 1 | 0 | 10 | 10 | 0 | 0 | 9 | 8 | 9 | 8 | 7 |
| Do | Ethyl | 4 | 10 | 10 | 10 | 4 | 2 | 10 | 8 | 9 | 10 | 10 |
|  |  | 2 | 1 | 10 | 10 | 4 | 2 | 8 | 9 | 9 | 10 | 9 |
|  |  | 1 | 0 | 10 | 8 | 0 | 0 | 7 | 7 | 9 | 10 | 9 |
| Do | n-Butyl | 4 | 6 | 10 | 10 | 1 | 6 | 10 | 9 | 10 | 10 | 10 |
|  |  | 2 | 1 | 10 | 10 | 0 | 2 | 8 | 8 | 9 | 9 | 9 |
|  |  | 1 | 3 | 10 | 7 | 0 | 3 | 9 | 8 | 9 | 7 | 7 |
| Do | Phenyl | 4 | 9 | 10 | 10 | 2 | 6 | 10 | 7 | 10 | 10 | 8 |
|  |  | 2 | 3 | 10 | 10 | 3 | 2 | 10 | 8 | 9 | 9 | 8 |
|  |  | 1 | 0 | 10 | 10 | 2 | 1 | 10 | 8 | 9 | 7 | 7 |
| 4-chloro-2-methyl phenyl | Methyl | 4 | 0 | 10 | 9 | 2 | 6 | 9 | 9 | 10 | 10 | 10 |
|  |  | 2 | 0 | 8 | 9 | 1 | 0 | 4 | 8 | 9 | 7 | 7 |
|  |  | 1 | 0 | 5 | 7 | 0 | 0 | 3 | 8 | 9 | 7 | 7 |
| Do | Ethyl | 4 | 3 | 10 | 9 | 7 | 8 | 9 | 9 | 10 | 10 | 10 |
|  |  | 2 | 0 | 7 | 7 | 0 | 1 | 3 | 8 | 9 | 7 | 7 |
|  |  | 1 | 0 | 8 | 7 | 0 | 1 | 5 | 8 | 9 | 8 | 8 |
| Do | n-Butyl | 4 | 0 | 8 | 9 | 4 | 8 | 4 | 8 | 10 | 10 | 10 |
|  |  | 2 | 0 | 6 | 7 | 2 | 0 | 4 | 9 | 10 | 10 | 10 |
|  |  | 1 | 0 | 6 | 8 | 0 | 0 | 3 | 9 | 9 | 5 | 7 |
| Do | Phenyl | 4 | 2 | 10 | 10 | 3 | 4 | 6 | 8 | 9 | 10 | 10 |
|  |  | 2 | 0 | 8 | 9 | 2 | 0 | 5 | 8 | 9 | 5 | 6 |
|  |  | 1 | 0 | 4 | 9 | 0 | 0 | 5 | 8 | 9 | 4 | 6 |
| 4-chlorophenyl | 2-ethyl hexyl | 4 | 0 | 8 | 8 | 10 | 0 | 9 | 10 | 10 | 10 | 7 |
|  |  | 2 | 0 | 7 | 9 | 2 | 0 | 6 | 7 | 8 | 7 | 7 |
|  |  | 1 | 0 | 6 | 9 | 0 | 0 | 6 | 6 | 6 | 4 | 5 |
| 4-chloro-2-methyl phenyl | do | 4 | 2 | 10 | 10 | 1 | 0 | 7 | 9 | 10 | 10 | 10 |
|  |  | 2 | 2 | 10 | 9 | 0 | 0 | 6 | 9 | 10 | 8 | 8 |
|  |  | 1 | 0 | 7 | 8 | 0 | 0 | 5 | 9 | 9 | 9 | 9 |
| 2,4,5-trichlorophenyl | do | 4 | 6 | 10 | 10 | 6 | 2 | 10 | 8 | 10 | 10 | 9 |
|  |  | 2 | 0 | 10 | 10 | 6 | 3 | 10 | 9 | 10 | 9 | 8 |
|  |  | 1 | 1 | 10 | 10 | 6 | 3 | 10 | 9 | 10 | 9 | 8 |

TABLE 6.—SECONDARY SCREENING—PRE-EMERGENCE ACTIVITY

| R' | R | Rate | Oats | Cuc. | Snap Beans | Corn | Wheat | Flax | Cotton | Rad. | Sugar Beets | Alfalfa |
|---|---|---|---|---|---|---|---|---|---|---|---|---|
| 4-chlorophenyl | Methyl | 4 | 3 | 8 | 9 | 0 | 2 | 9 | 8 | 9 | 8 | 8 |
|  |  | 2 | 3 | 5 | 7 | 0 | 0 | 7 | 3 | 8 | 9 | 6 |
|  |  | 1 | 2 | 5 | 8 | 0 | 0 | 7 | 5 | 0 | 8 | 6 |
| Do | Ethyl | 4 | 4 | 8 | 7 | 0 | 4 | 8 | 8 | 8 | 5 | 5 |
|  |  | 2 | 0 | 7 | 7 | 0 | 2 | 8 | 5 | 8 | 7 | 4 |
|  |  | 1 | 0 | 4 | 7 | 0 | 2 | 7 | 3 | 7 | 6 | 6 |
| Do | n-Butyl | 4 | 0 | 7 | 8 | 0 | 3 | 8 | 5 | 8 | 9 | 7 |
|  |  | 2 | 0 | 3 | 7 | 0 | 2 | 7 | 3 | 7 | 7 | 4 |
|  |  | 1 | 0 | 5 | 6 | 0 | 0 | 6 | 1 | 6 | 6 | 4 |
| Do | Phenyl | 4 | 0 | 6 | 8 | 0 | 6 | 7 | 4 | 8 | 7 | 6 |
|  |  | 2 | 0 | 4 | 7 | 0 | 0 | 6 | 0 | 6 | 4 | 3 |
|  |  | 1 | 0 | 3 | 6 | 0 | 0 | 6 | 1 | 7 | 5 | 2 |
| 2,4,5-trichlorophenyl | Methyl | 4 | 5 | 7 | 9 | 2 | 4 | 8 | 0 | 8 | 7 | 8 |
|  |  | 2 | 0 | 3 | 6 | 1 | 0 | 7 | 0 | 7 | 8 | 9 |
|  |  | 1 | 0 | 3 | 7 | 0 | 0 | 6 | 0 | 1 | 6 | 7 |
| Do | Ethyl | 4 | 0 | 3 | 0 | 0 | 0 | 4 | 0 | 6 | 7 | 7 |
|  |  | 2 | 0 | 2 | 0 | 0 | 0 | 2 | 0 | 5 | 0 | 4 |
|  |  | 1 | 0 | 0 | 0 | 0 | 0 | 0 | 0 | 0 | 0 | 0 |
| Do | n-Butyl | 4 | 3 | 4 | 8 | 0 | 0 | 8 | 0 | 7 | 8 | 9 |
|  |  | 2 | 0 | 2 | 5 | 0 | 0 | 5 | 0 | 5 | 6 | 7 |
|  |  | 1 | 0 | 2 | 0 | 0 | 0 | 4 | 0 | 2 | 6 | 0 |
| Do | Phenyl | 4 | 3 | 7 | 9 | 3 | 3 | 7 | 0 | 7 | 8 | 10 |
|  |  | 2 | 0 | 1 | 4 | 0 | 0 | 7 | 0 | 5 | 6 | 6 |
|  |  | 1 | 0 | 0 | 0 | 0 | 0 | 6 | 0 | 5 | 4 | 7 |
| 4-chloro-2-methyl phenyl | Methyl | 4 | 6 | 8 | 7 | 4 | 7 | 8 | 9 | 10 | 10 | 10 |
|  |  | 2 | 5 | 8 | 5 | 2 | 6 | 9 | 9 | 10 | 10 | 10 |
|  |  | 1 | 3 | 7 | 3 | 0 | 3 | 8 | 9 | 10 | 9 | 10 |
| Do | Ethyl | 4 | 2 | 9 | 6 | 4 | 7 | 7 | 9 | 9 | 9 | 10 |
|  |  | 2 | 1 | 7 | 7 | 2 | 5 | 7 | 9 | 10 | 9 | 9 |
|  |  | 1 | 0 | 7 | 7 | 1 | 5 | 5 | 8 | 9 | 8 | 9 |
| Do | n-Butyl | 4 | 5 | 7 | 3 | 2 | 4 | 8 | 9 | 10 | 10 | 10 |
|  |  | 2 | 3 | 6 | 4 | 0 | 3 | 7 | 9 | 8 | 9 | 9 |
|  |  | 1 | 3 | 7 | 5 | 1 | 4 | 6 | 8 | 9 | 7 | 9 |
| Do | Phenyl | 4 | 3 | 8 | 4 | 2 | 4 | 8 | 9 | 10 | 10 | 10 |
|  |  | 2 | 3 | 8 | 3 | 0 | 4 | 5 | 7 | 9 | 9 | 9 |
|  |  | 1 | 0 | 3 | 1 | 0 | 0 | 4 | 9 | 9 | 9 | 9 |
| 4-chlorophenyl | 2-ethyl hexyl | 4 | 1 | 3 | 7 | 0 | 4 | 7 | 4 | 7 | 6 | 5 |
|  |  | 2 | 1 | 4 | 6 | 0 | 1 | 6 | 3 | 6 | 4 | 0 |
|  |  | 1 | 0 | 0 | 6 | 0 | 1 | 5 | 2 | 3 | 3 | 0 |
| 4-chloro-2-methyl phenyl | do | 4 | 3 | 7 | 6 | 2 | 5 | 8 | 9 | 9 | 9 | 10 |
|  |  | 2 | 2 | 5 | 6 | 0 | 5 | 6 | 7 | 9 | 9 | 9 |
|  |  | 1 | 1 | 6 | 2 | 1 | 4 | 7 | 9 | 9 | 6 | 9 |
| 2,4,5-trichlorophenyl | do | 4 | 6 | 6 | 3 | 0 | 0 | 8 | 3 | 6 | 9 | 10 |
|  |  | 2 | 0 | 0 | 5 | 0 | 0 | 9 | 0 | 5 | 3 | 8 |
|  |  | 1 | 0 | 2 | 0 | 0 | 0 | 5 | 1 | 2 | 2 | 5 |

In the following table illustrating defoliant and desiccant activity, the phosphonates were formulated into a mixture containing 0.5 gram of the test chemical in 25 ml. of acetone containing ½% of Tween 20 [tris (polyoxyethylene) sorbitan mono laurate]. This mixture was sprayed on cotton plants in the flowering stage of development using the indicated dosages in pounds of active ingredient per acre. Observations were made 7 days after spraying the plants. In some instances only the desiccation effect was recorded and in other cases the results of both defoliation and desiccation were noted. The results are set forth in Table 7. The compounds employed in Table 7 had the formula

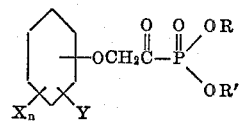

where $n$ is an integer from 1 to 3, X is chlorine, Y is hydrogen or methyl and the unspecified carbon atoms of the benzene ring are attached to hydrogen.

TABLE 7

| X | Y | R and R' | Rate (lbs./acre) | Percent Defoliation | Percent Desiccation |
|---|---|---|---|---|---|
| 4-chloro | Hydrogen | Methyl | 8 | 21.7 | 65 |
|  |  |  | 2 | 5.9 | 45 |
| Do | do | Ethyl | 8 | 10.5 | 65 |
|  |  |  | 2 | 0.0 | 50 |
| Do | do | n-Butyl | 8 | 0 | 55 |
|  |  |  | 2 | 0 | 60 |
| Do | do | 2'-ethylhexyl | 8 | 0 | 45 |
| Do | do | Phenol | 8 | 67 | 60 |
|  |  |  | 2 | 0 | 40 |
| 2-chloro | do | Ethyl | 8 | 0 | 35 |
|  |  |  | 2 | 0 | 25 |
| Do | do | n-Butyl | 8 | 71 | 50 |
|  |  |  | 2 | 71 |  |
| Do | do | 2'-ethylhexyl | 8 | 28.6 | 50 |
| Do | do | Phenyl | 8 | 0 | 20 |
|  |  |  | 2 | 67 |  |
| 4-chloro | 2-methyl | Methyl | 8 | 0 | 70 |
|  |  |  | 2 | 0 | 50 |
| Do | do | Ethyl | 8 | 11.8 | 70 |
|  |  |  | 2 | 6.3 | 70 |
| Do | do | n-Butyl | 8 | 0 | 65 |
|  |  |  | 2 | 0 | 65 |
| Do | do | 2'-ethylhexyl | 8 | 0 | 50 |
| Do | do | Phenyl | 8 | 0 | 70 |
| 2,4,5-trichloro | Hydrogen | Methyl | 8 | 0 | 55 |
|  |  |  | 2 | 0 | 75 |
| Do | do | Ethyl | 8 | 0 | 80 |
|  |  |  | 2 | 0 | 80 |
| Do | do | n-Butyl | 8 | 0 | 55 |
|  |  |  | 2 | 0 | 70 |
| Do | do | 2'-ethylhexyl | 8 | 0 | 75 |
|  |  |  | 2 | 12.5 | 70 |
| Do | do | Phenyl | 8 | 0 | 75 |
|  |  |  | 2 | 0 | 75 |

TABLE 7.—Continued

| X | Y | R and R' | Rate (lbs./acre) | Percent Defoliation | Percent Desiccation |
|---|---|---|---|---|---|
| 4-chloro | do | 2'-chloroethyl | 8 / 2 | | 45 / 30 |
| Do | do | Isopropyl | 8 / 2 | | 40 / 55 |
| Do | 2-methyl | 2'-chloroethyl | 8 / 2 | | 65 / 50 |
| Do | do | Isopropyl | 8 / 2 | | 65 / 35 |
| Do | do | Octadecyl | 8 | | 10 |
| 2,4-dichloro | Hydrogen | Methyl | 8 / 2 | | 95 / 75 |
| Do | do | Ethyl | 8 / 2 | | 95 / 60 |
| Do | do | Isopropyl | 8 / 2 | | 95 / 95 |
| Do | do | 2'-chloroethyl | 8 / 2 | | 50 / 50 |
| Do | do | n-Butyl | 8 / 2 | | 100 / 65 |
| Do | do | 2-ethylhexyl | 8 / 2 | | 80 / 65 |
| Do | do | Octadecyl | 8 | | 30 |
| Do | do | Phenyl | 8 / 2 | | 80 / 60 |
| 2,4,5-trichloro | do | 2'-chloroethyl | 8 / 2 | | 45 / 35 |
| Do | Hydrogen | Isopropyl | 8 / 2 | | 80 / 60 |
| Do | Hydrogen | Octadecyl | 8 | | 30 |

I claim:

1. A compound having the formula

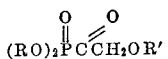

where R is selected from the group consisting of alkyl of up to 18 carbon atoms, phenyl, lower alkyl phenyl, chloro lower alkyl and cyano lower alkyl and R' is selected from the group consisting of mono-, di- and trihalophenyl and monohalo monomethyl phenyl.

2. A compound according to claim 1 wherein all halogens on the R' substituent are chlorine.

3. O,O-di lower alkyl mono to trichlorophenoxyacetyl phosphonate.

4. O,O-diphenyl mono to tri chlorophenoxy acetyl phosphonate.

5. O,O-di lower alkyl phenyl mono to tri chlorophenoxyacetyl phosphonate.

6. O,O-dialkyl mono methyl mono chlorophenoxy acetyl phosphonate having up to 18 carbon atoms in the alkyl group.

7. O,O-di lower alkyl mono methyl mono chlorophenoxyacetyl phosphonate.

8. O,O-diphenyl mono methyl mono chlorophenoxy acetyl phosphonate.

9. O,O-di (chloro lower alkyl) mono to tri chlorophenoxy acetyl phosphonate.

10. O,O-di (chloro lower alkyl) mono methyl mono chlorophenoxy acetyl phosphonate.

11. O,O-di (cyano lower alkyl) mono to tri chlorophenoxy acetyl phosphonate.

12. O,O-di (cyano lower alkyl) mono methyl mono chlorophenoxy acetyl phosphonate.

References Cited

UNITED STATES PATENTS 2,900,408   8/1958   Blaser et al.   260—946 XR

CHARLES B. PARKER, *Primary Examiner.*

A. H. SUTTO, *Assistant Examiner.*